United States Patent [19]

Schoening et al.

[11] Patent Number: 4,692,301
[45] Date of Patent: Sep. 8, 1987

[54] STEAM GENERATOR HEATED WITH THE COOLING GAS OF A NUCLEAR REACTOR

[75] Inventors: Josef Schoening, Hambucken; Claus Elter, Bad Durkheim; Jürgen Rautenberg, Stettfeld, all of Fed. Rep. of Germany

[73] Assignee: Hochtemperatur-Reaktorbau GmbH, Dortmund, Fed. Rep. of Germany

[21] Appl. No.: 735,922

[22] Filed: May 20, 1985

[30] Foreign Application Priority Data

May 18, 1984 [DE] Fed. Rep. of Germany ....... 3418528

[51] Int. Cl.$^4$ ............................................. G21D 5/12
[52] U.S. Cl. ................................... 376/391; 376/381; 122/32
[58] Field of Search ............... 376/378, 381, 383, 391, 376/402; 122/32

[56] References Cited

U.S. PATENT DOCUMENTS 4,098,329 7/1978 Culver ................................. 122/32
4,158,604 6/1979 Cook et al. .
4,224,983 9/1980 Thurston et al. ................... 376/391

FOREIGN PATENT DOCUMENTS 2659093 7/1978 Fed. Rep. of Germany ...... 376/391
2854499 6/1980 Fed. Rep. of Germany .
2903644 8/1980 Fed. Rep. of Germany .

Primary Examiner—Deborah L. Kyle
Assistant Examiner—Richard L. Klein
Attorney, Agent, or Firm—Robert J. Koch

[57] ABSTRACT

The invention concerns a steam generator heated by the cooling gas of a nuclear reactor and arranged in the reactor pressure vessel within a vertical shaft. A blower associated with the steam generator is installed above it. The hot gas is conducted to the steam generator in the form of a helical bundle in the downward direction, with the hot gas being conducted initially downward through an annular channel and entering the bundle of heat exchanger tubes at a uniform velocity. The annular channel is sealed in upward direction by means of a sliding seal, which also serves as an earthquake support. In order to provide access to the feed water and live steam lines in view of the blower arranged on top, the two lines are conducted laterally out of and through the reactor pressure vessel. By means of the special fixation of the individual tubes of the heat exchanger bundle in vertical plates and the presence of an expansion zone for the recycling pipes, differential thermal expansion may be kept small.

14 Claims, 4 Drawing Figures

STEAM GENERATOR HEATED WITH THE COOLING GAS OF A NUCLEAR REACTOR

BACKGROUND OF THE INVENTION

1. Field of the Invention

The invention relates to a steam generator heated with the cooling gas of nuclear reactor, arranged in a vertical shaft clad with a metal liner within the reactor pressure vessel, with an in-line blower installed above the steam generator in the vertical shaft, with two gas conduits entering the vertical shaft, the lower one of which serves to introduce the hot gas and the upper one to exhaust the cold gas, and with feed water and live steam lines leading out from the reactor pressure vessel.

2. Description of the Prior Art

A steam generator with the characteristics set forth above is described in U.S. Pat. No. 4,158,604. It is part of a nuclear reactor plant housed in a reinforced concrete pressure vessel, with the nuclear reactor being installed in a central cavity. The installation comprises a plurality of steam generators of the aforedescribed type and the same number of auxiliary coolers with blowers following them in line. All of these components are located in vertical shafts arranged around the center cavity. The center cavity is connected with the vertical shafts containing the steam generators with two gas conduits each, the lower one of which carries hot gas and enters the shaft under the steam generator, while the upper gas conduit exits from the shaft in the area of the blower outlet and returns the cold gas into the reactor cavity. The feed water and live steam lines for the steam generators leave the vertical shafts at the bottom and are lead out of the prestressed concrete pressure vessel in the downward direction. This has the disadvantage that they are not accessible for recurrent tests and maintenance measures.

The state of the art further includes a straight pipe steam generator described in West German Offenlegungsschrift No. 28 54 499 for a nuclear reactor plant which again is installed in a lined recess of the reactor pressure vessel. Here again, the feed water and live steam lines exit at the bottom from the recess. The hot gas enters through an upper conduit into the recess, with the conduit being connected with an inflow hood surrounding the upper end of the nest of tubes. A lower conduit provided for the cold gas is fixedly joined with a cold gas conduit surrounding the compensation area and connected at the bottom with the jacket of the steam generator.

West German Offenlegungsschrift No. 29 03 644 discloses another steam generator heated with the cooling gas of a nuclear reactor; it is installed in a recess of the pressure vessel. In the case of this steam generator the hot gas is again introduced in the upper area and the cold gas exhausted through a conduit exiting at the end of the recess. However, the feed water and the live steam lines exit on top on the frontal side from the steam generator, so that it is not possible to arrange the associated blower over the steam generator. The feed water and live steam line is in the form of a coaxial conduit and is lead to the outside through the roof of the recess. The nest of tubes, which consists of bayonet tubes, and the jacket of the steam generator are suspended from a support plate, over which the feed water distributor and the live steam collector are arranged.

SUMMARY OF THE INVENTION

Based on this state of the art, it is the object of the invention to provide a steam generator of the above described type, in which only small relative structural displacements occur within the components and wherein recurrent tests may be effected without a major technical effort. Favorable inflow conditions for the hot gas are to be provided further on the steam generator.

According to the invention, this object is attained by extending the bundle of heating surfaces in the form of known helical tubes and surrounded by a steam generator jacket past the entry of the hot gas conduit, providing a reversing range between the end of the bundle and the bottom of the shaft and forming between the metal liner and the jacket of the steam generator an annular conduit to conduct the hot gas in downward direction. Directly above the inlet of the hot gas conduit a sliding seal is built in between the metal liner and the jacket of the steam generator, which simultaneously is designed to serve as the earthquake support of the steam generator. The feed water line and the live steam line are conducted in the cold gas area laterally from the vertical shaft and through the reactor pressure vessel. The individual tubes of the heating surface bundle are immobilized by means of a plurality of vertical support plates, which are welded with their upper ends on top to the jacket of the steam generator, resting by means of a support flange on the metal liner of the vertical shaft.

By means of the specific configuration of the lower area of the steam generator whereby the hot gas is forced initially to flow downwardly and to enter the steam generator from an annular conduit, a uniform flow against the heat exchanger bundle is obtained. If the steam generator is operated in the stand by mode (i.e., heat is removed from the reactor core by auxiliary loops), the heat exchanger jacket extending downwardly past the hot gas inlet prevents the generation of a hot convection flow in the steam generator. The steam generator according to the invention is further provided with an adequate collecting volume for water if there should be an intrusion of water due to a failure of steam generator pipes. The corrosion damage potentially occurring as a consequence of such an intrusion to structural graphite parts may thus be limited.

The introduction of feed water and the removal of live steam in lines exiting laterally at the upper, cold end of the steam generator has the advantage that the different thermal expansions taking place within the steam generator are slight and the conduit loops required for compensation may be laid out simply with relatively small dimensions. The tubing of the bundles, together with the lines for the feed water and the live steam, may be inspected in the course of recurring tests and defective tubes may be blocked individually. These operations are remotely controlled or performed automatically without the need for opening the primary loop of the nuclear reactor. Above all, the lateral exit of the feed water and live steam lines from the reactor pressure vessel makes it possible to place the blower above the steam generator in the vertical shaft whereby it may be constructed well.

The sliding seal provided over the hot water conduit in the annular conduit between the jacket of the steam generator and the metal liner of the vertical shaft prevents the penetration of hot gas into the space located above it and to the support flange. The sliding seal is laid out so that (in addition to its primary function) in the case of an earthquake it is capable of limiting the deflection of the steam generator.

The heat exchanger bundle in the form of a helical bundle is arranged preferably in concentric, multipass wound tubular cylinders. The weight of the heat exchanger bundle is transferred by means of the vertical support plates and the jacket of the heat exchanger, which comprises at its upper end a flange, to the support flange fastened to the metal liner. The fixed points of the steam generator are established so that only minimal differential thermal expansions can occur.

BRIEF DESCRIPTION OF THE DRAWINGS

Advantageous further developments of the invention will become apparent from the dependent claims and the description below of an embodiment with reference to the schematic drawings. The figures show in detail:

DETAILED DESCRIPTION OF THE PREFERRED EMBODIMENT

Figure 1:
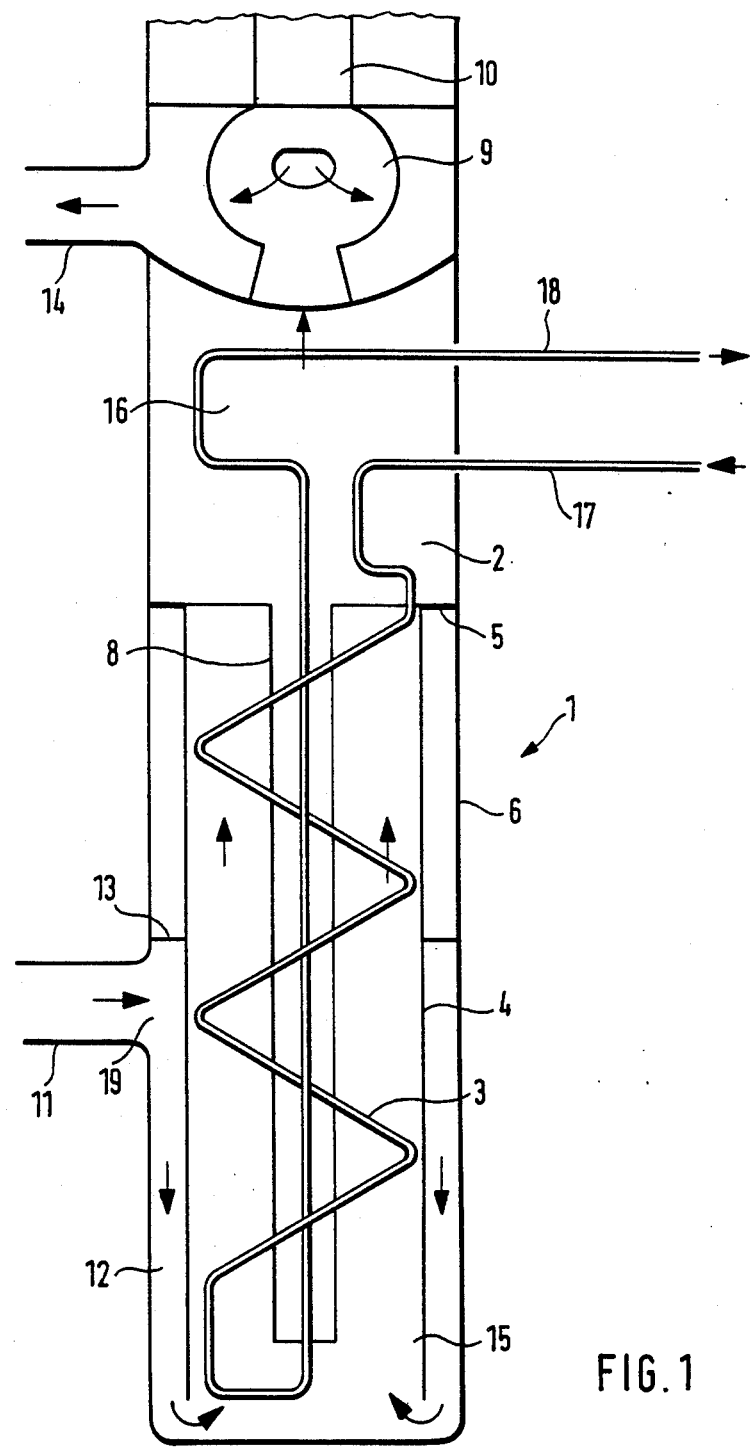
FIG. 1 the fundamental diagram of the steam generator according to the invention, FIG. 2 a longitudinal section on the line II—II of FIG. 3, and FIG. 3 a horizontal section on the line III—III of FIG. 2.
Figure 2:
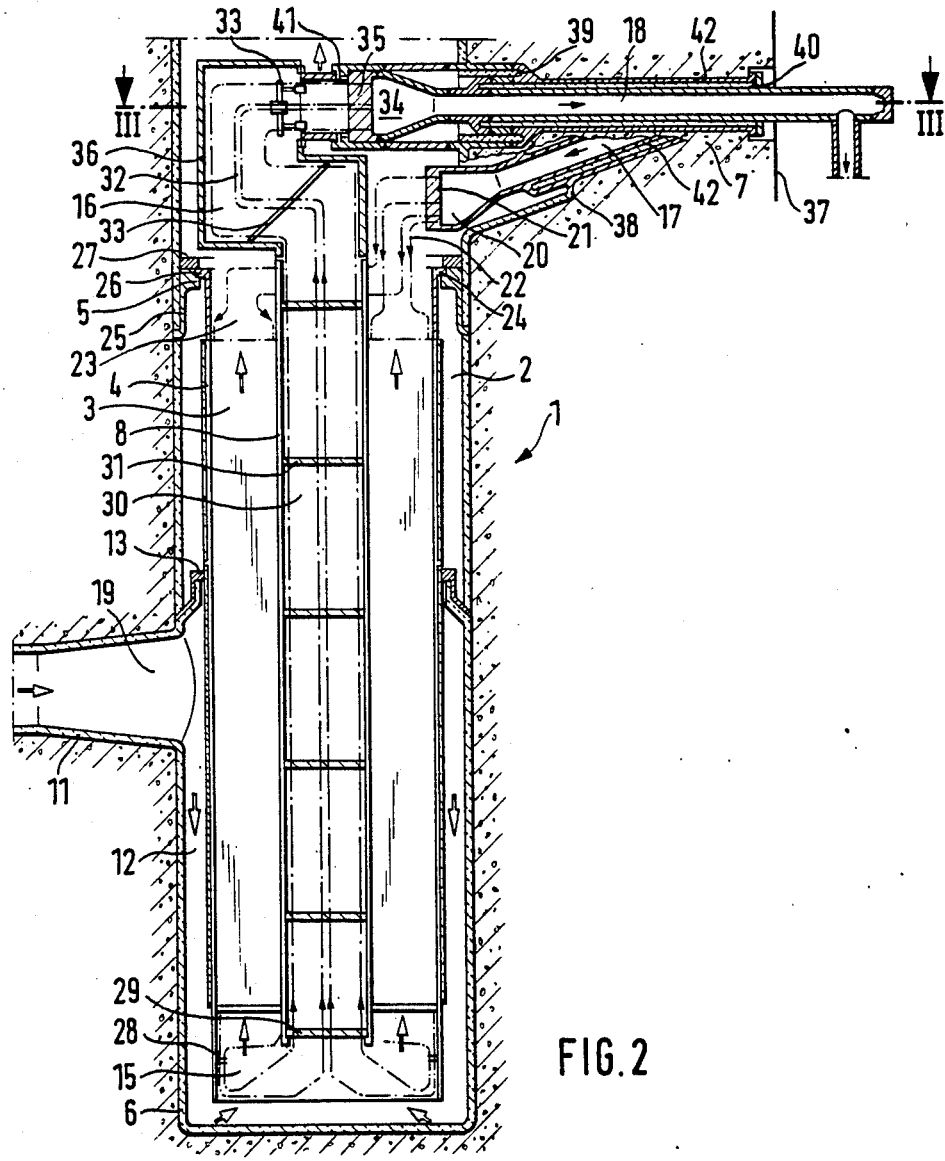
Figure 4:
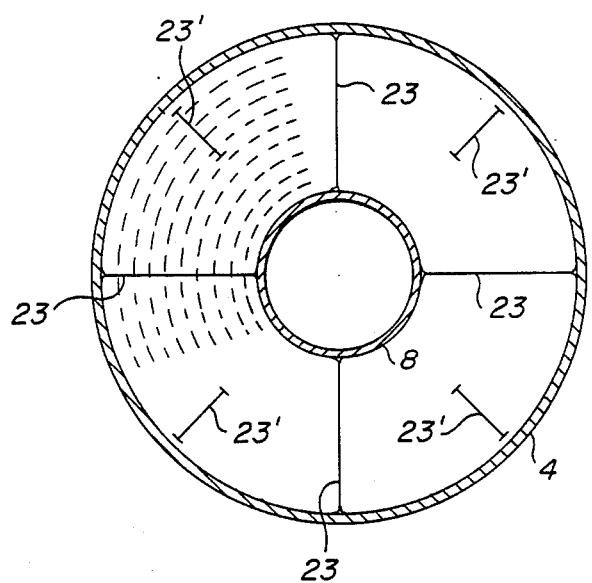
FIG. 4 shows a simplified section through the steam generator jacket.

FIG. 1 shows a steam generator located generally at 1 installed in a vertical shaft 2. A bundle of heat transfer surfaces 3 of a helical configuration is surrounded by a thermally insulated steam generator jacket 4. The latter is supported by means of a support flange 5 on a metal liner 6, again thermally insulated, lining the vertical shaft 2. The vertical shaft 2 is located in the wall of a pre-stressed concrete pressure vessel 7 (as shown in FIG. 2), wherein a gas cooled nuclear reactor (not shown) is housed. A center tube 8 is positioned through the bundle of heat transfer surfaces 3.

A blower 9 driven by a motor 10, is arranged above the steam generator 1. Far above the end of the steam generator a hot gas conduit 11 enters the vertical shaft 2, through which the gas heated in the nuclear reactor to 680° C., is passed to the steam generator 1. The hot gas initially flows downward through an annular channel 12 formed by the metal liner 6 and the steam generator 4, then is deflected at the end of the shaft and enters the steam generator 1 at the bottom with a uniform velocity. In the generator, it first flows through a reversing area 15 prior to impacting the bundle of heat transfer surfaces 3.

After the transfer of heat to the heat transfer surfaces 3, the gas flows through an expansion zone 16 and enters the blower 9. After compression the gas is then returned to the nuclear reactor through a cold gas conduit 14 at 280° C. To prevent the penetration of the hot gas to the support flange 5, a sliding seal 13 is provided in the annular channel 12 above the inlet 10 of the hot gas conduit 11, which also serves as an earthquake support for the steam generator 1.

The feed water is conducted to the steam generator by means of a line 17; the live steam generated is removed thorugh a line 18. The lines 17 and 18 leave the cold gas area and are conducted laterally out of the prestressed concrete pressure vessel 7. The inlet temperature of the feed water is about 200° C.; the temperature of the live steam is 530° C. at the outlet of the steam generator.

Figure 3:
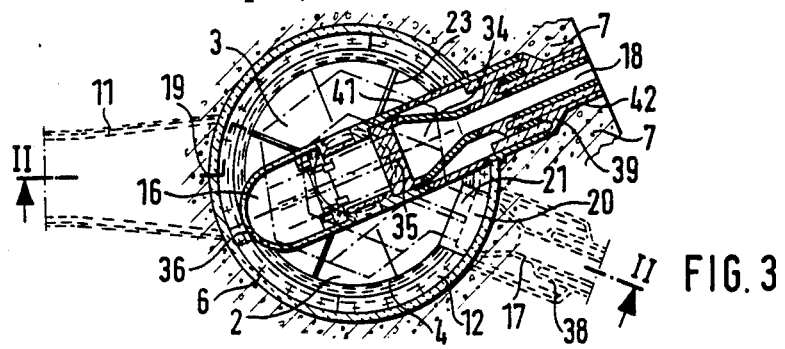

In FIGS. 2 and 3 the details also shown in FIG. 1 are provided with the same reference symbols.

The feed water line 17 terminates in a feed water distributor 20, with the individual tubes being connected with the perforated plate 21 of the distributor 20 and conducted in a loop 22 to the nest of heat transfer surfaces 3. The nest of heat transfer surfaces 3 comprise concentric, multipass wound tubular cylinders, the individual tubes whereof are immobilized in four vertical support plates 23. The support plates 23 are welded on their upper ends to the jacket 4 of the steam generator and the center tube 8. Between these four fixed support plates four additional floating vertical plates 23' are provided to connect the tubes with each other at the outer tubular cylinders to limit the free length of the tubes. These plates carry no load.

By means of the four support plates 23 the weight of the bundled tubes is transferred to the jacket 4 of the steam generator. It is equipped on its upper end with a flange 24. The flange 24 rests on a support flange 5, fastened by means of a thermosleeve 25 to the metal liner 6. Any oblique position of the support flange 5 may be equalized prior to the installation of the steam generator 1 by a compensating ring 26, secured by means of a multiple part flange ring 27 set onto the supporting flange 5. A gasket built into the flange joint separates the spaces located above and under the flange joint in a gas tight manner.

The bundle of heat transfer surfaces 3 is followed downward in the flowpath by the aforementioned reversing area 15. In the reversing area 15 the individual tubes are initially conducted to a support ring 28 fastened to the jacket 4 of the heat generator. Subsequently, they are deflected by 180° C. and combined in a perforated plate 29 into a bundle 30 of straight tubes. The perforated plate 29 is welded to the lower end of the center tube 8. The individual tubes are fastened in the perforated plate 29 by the thermosleeve in a gas tight manner, so that the straight tube bundle 30 is completely separated from the hot gas area. The load of the bundle of straight tubes 30 is transferred to the center tube 8 by means of the perforated plate 29. The individual tubes of the straight tube bundle 30 are held together by a plurality of spacers 31.

The straight tube bundle 30 is followed by the expansion zone 16 for the recycling pipes 32, in which the live steam is conducted to a live steam collector 34 preceding the live steam line 18. In the expansion zone 16 the differential thermal expansions occurring between the helical bundle 3 and the straight tube bundle 30 are equalized. In this area special intermediate supports 33 are provided for the recycling pipes 32.

The entire expansion zone 16 is surrounded by a sheet metal jacket 36 insulated on the inside in order to prevent the transfer of heat from the live steam to the cold gas flowing through this area. The sheet metal jacket 36 is fastened on one side to the center tube 8 and is connected on the other side with the perforated plate 35 of the live steam collector 34.

The live steam line 8 (located in FIG. 2 in the sectioning plane) is conducted horizontally out from the prestressed concrete pressure vessel 7, while the feed water line 17 extends at a slight angle to the horizontal. In this fashion the two lines pass through the external side 37 of the pressure vessel 7 at nearly the same height. Because the horizontal wound prestressing of the pressure vessel 7 must necessarily be eliminated at the outlet locations of the lines 17, 18, it is advantageous to place the outlet locations as close to each other as possible.

The feed water line 17 and the live steam line 18 are connected by means of a thermosleeve 38 and 39, respectively, each with the metal liner 42, such thermosleeves lining the passages for the lines 17, 18 in the pressure vessel 7. These joint locations also represent primary seals. In order to limit the potential outflow rate in case of a failure, flow limiters 40 are provided on the outside 37 of the pressure vessel, which normally are not under pressure. The spaces between the lines 17, 18 and the metal liners 42 are insulated. The live steam collector 34 is surrounded by a retaining cylinder 41 which again is normally not under pressure and which in case of a fracture at the collector 34 holds the perforated plate 35 and thus the tubes of the bundle in their initial position, while limiting the penetration of steam into the primary loop.

Due to the choice of points of fixation in the case of the steam generator according to the invention and thermal expansion differences to be equalized in the individual compensation zones are relatively small.

What is claimed is:

1. A steam generator heated with cooling gas of a nuclear reactor, arranged in a vertical shaft clad with a metal liner in a reactor pressure vessel, with a blower following in line and installed above the steam generator in the vertical shaft, comprising:
    a cold gas conduit and a hot gas conduit entering the vertical shaft, the hot gas conduit serves to supply hot gas and the cold gas conduit serves to remove cold gas from the steam generator wherein the cold gas conduit is positioned above the hot gas conduit;
    feed water and live steam lines leading out of the reactor pressure vessel, connected to heat transfer surfaces laid out as a helical bundle and surrounded by a bundle jacket of the steam generator open in a downward direction and not extending to the bottom of the shaft wherein the heat transfer surfaces extend past an inlet location of the hot gas conduit;
    a reversing area located between a lower end of the bundle and the bottom of the shaft, defined by a downward extension of the bundle jacket;
    an annular canal for conducting the hot gas in a downward direction, formed between the metal liner and the bundle jacket;
    means for blocking upward flow of cooling gas and performing earthquake support functions of said steam generator and comprising a sliding gasket in the annular canal positioned directly above the inlet location of the hot gas conduit between the metal liner and the bundle jacket;
    wherein the feed water line and the live steam line lead out laterally from the vertical shaft and through the reactor pressure vessel in an upper portion or cold gas range of the steam generator between said blower and an upper end of said bundle, and that the bundle of heat transfer surfaces are made up of individual tubes;
    a center tube arranged within said helical bundle and surrounding a straight tube bundle of said individual tubes deflected 180° from said helical bundle in said reversing area;
    a perforated plate, welded to said center tube, traversed by said straight tube bundle and arranged to block flow of cooling gas into said center tube;
    a plurality of recycling tubes, arranged in an expansion zone, connecting said straight tube bundle to said live steam lines;
    an insulated sheet metal jacket surrounding said expansion zone, connected to said center tube;
    means for immobilizing said individual tubes comprising a plurality of vertical support plates with upper ends welded on top of the bundle jacket and said center tube, a support flange on the metal liner of the vertical shaft supporting an upper end of said bundle jacket.

2. A steam generator according to claim 1, further comprising a thermosleeve for fastening the support flange to the metal liner and a multipart flange ring set upon the support flange for the fixation of the steam generator.

3. A steam generator according to claim 1, further comprising a plurality of vertical floating plates for the further immobilization of the tubes of the bundle between the fastened vertical support plates to connect the tubes with each other.

4. A steam generator according to claim 1, further comprising a support ring in the reversing area under the bundle of heat transfer surfaces fastened to the bundle jacket of the steam generator through which the bundled tubes are deflected by 180° under the support ring.

5. A steam generator according to claim 4, further comprising a thermosleeve in the perforated plate for individually fastening the tubes of the bundle said perforated plate and said center tube a separate hot gas area in the vicinity of the inlet of the hot gas conduit in a gas tight manner from an inner area of the center tube.

6. A steam generator according to claim 5, further comprising intermediate supports within the sheet metal jacket provided for the recycling tubes.

7. A steam generator according to claim 1, further comprising a live steam collector at an outlet of the live steam line and a feed water distributor at an inlet of the feed water line, wherein the feed water distributor is arranged underneath the live steam collector within an expansion zone inside the vertical shaft.

8. A steam generator according to claim 1, wherein the feed water line and the live steam line are inclined to each other in the course of their passage from the reactor vessel so that they penetrate an outer side of the vessel at approximately the same height.

9. A steam generator according to claim 8, wherein both the feed water line and the live steam line are connected by means of a thermosleeve with a metal liner of a passage through the vessel wall for the line involved and further comprising a flow limiter around each line at an outlet location of the two lines from the reactor pressure vessel.

10. A steam generator according to claim 6 further comprising a live steam collector connected to an outlet of the live steam line and surrounded by a retaining cylinder which normally is not under pressure and which is connected on one side with the metal liner of the passage through the vessel wall, and on the other side with the sheet metal jacket of the expansion zone.

11. A steam generator according to claim 1, further comprising: intermediate supports within the sheet metal jacket provided for the recycling tubes.

12. A steam generator according to claim 1, wherein both the feed water line and the live steam line are connected by means of a thermosleeve with a metal liner of a passage through the vessel wall for the line involved and further comprising a flow limiter around each line at an outlet location of the two lines from the reactor pressure vessel.

13. A steam generator according to claim 11, further comprising a live steam collector connected to an outlet of the live steam line and surrounded by a retaining cylinder which normally is not under pressure and which is connected on one side with the metal liner of the passage through the vessel wall, and on the other side with the sheet metal jacket of the expansion zone.

14. A steam generator according to claim 7, further comprising a live steam collector connected to an outlet of the live steam line and surrounded by a retaining cylinder which normally is not under pressure and which is connected on one side with the metal liner of the passage through the vessel wall, and one the other side with the sheet metal jacket of the expansion zone.

* * * * *